Jan. 25, 1944.  B. HAYS  2,339,926
ROLL FILM HOLDER
Filed June 30, 1941
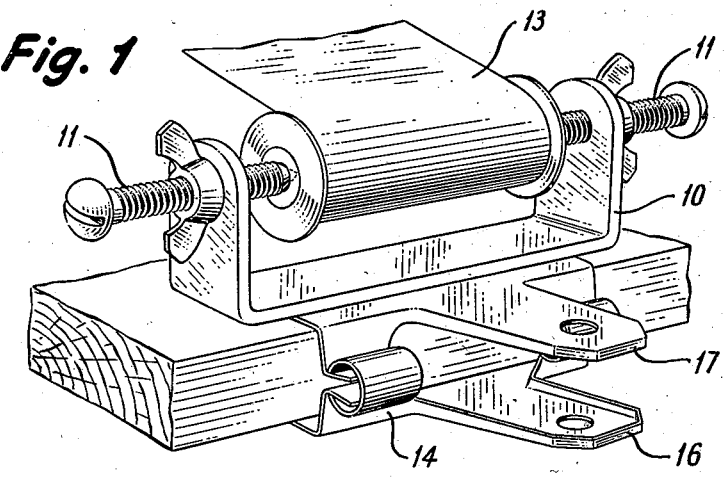
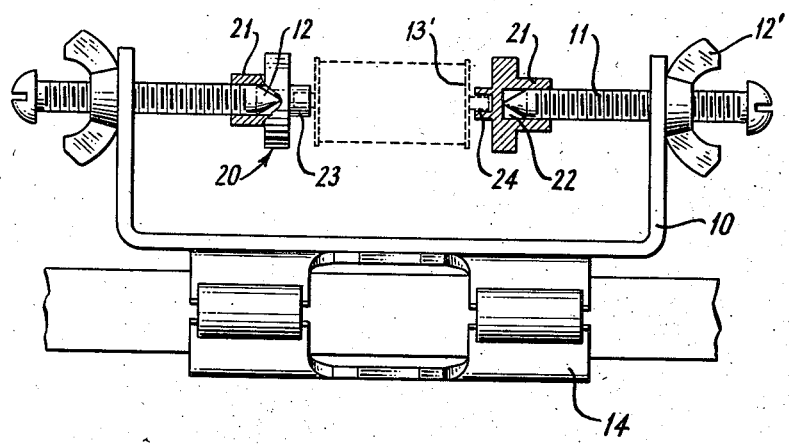
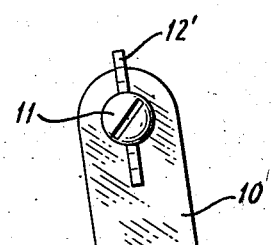
INVENTOR
BRYANT HAYS
BY
William A. Zaleski
ATTORNEY Patented Jan. 25, 1944

2,339,926

UNITED STATES PATENT OFFICE 2,339,926

ROLL FILM HOLDER

Bryant Hays, Linden, N. J.

Application June 30, 1941, Serial No. 400,382

7 Claims. (Cl. 242—79)

My invention relates to photographic apparatus for developing roll film, more particularly to film roll holders used in connection with loading rolled film developing tanks.

At the present time there is no convenient means for holding a roll film while loading the roll film developing tank. The film must be unrolled from the film roll and flexed to insert the same and thread it into the grooved spool or reel of the developing tank. The use of both hands is required in the operation which is awkward and difficult, and which operation is subject to the danger of dropping the film roll, causing the film to unroll and damage the film surface, or causing the film to be tangled on unrolling. In addition it is difficult to control the tension on the film while unrolling, further complicating the loading of the reel for the tank.

It is an object of my invention to provide a film roll holder for use in connection with a roll film developing tank.

It is another object of my invention to provide a portable film roll holder which can be easily secured to or detached from a support such as a chair or table top.

It is a further object of my invention to provide such a film roll holder in which the tension on the film can be regulated.

A further object of my invention is to provide a film roll holder which is capable of receiving various size rolls.

The novel features which I believe to be characteristic of my invention are set forth with particularity in the appended claims, but the invention itself will best be understood by reference to the following description taken in connection with the accompanying drawing in which Figure 1 is a perspective view of a film roll holder made according to my invention with a roll of film being supported for unrolling to be inserted into the reel of the developing tank, Figure 2 is an end elevation of the device shown in Figure 1 with a smaller size roll in place, and Figure 3 is a side elevation of the device made according to my invention.

Referring to the drawing, a film roll holder made according to my invention comprises a U-shaped yoke 10 in the legs of which are threadedly mounted the oppositely disposed spindles 11 having the cone-shaped ends 12 for engaging the spool of the roll of film 13. The cone-shaped ends are capable of receiving various size openings in different size spools and center them alike for rotational support. This type of support is also capable of engaging and supporting spools in which the spindle openings extend either all the way or partially through the film spool. Lock nuts 12' are provided for fixing the position of the spindles when they have been adjusted to the proper position to retain the roll with frictional contact. The degree of friction can be regulated by tightening or loosening one or the other of the spindles 11 by rotation in its threaded support in the leg of the yoke by which it is supported.

To provide means for easily attaching or detaching the holder to support or to release the same, the yoke is provided with a spring clip 14 having the rearwardly extending members 16 and 17 to be engaged for manual operation. Although shown as a separate unit to which the yoke is secured, it is obvious that the upper part of the clip and the yoke 10 could be stamped from a single piece and formed to shape. It is also obvious that various types of spring clip arrangements could be utilized for the purpose shown.

As shown in Figure 2, the roll support has attached auxiliary elements 20, having an extension 21 provided with an internally threaded hole or channel 22 for screwing the collar on spindle 11. A second extension 23 is provided with a recess 24 for receiving the spindle of the roll 13' and to provide a bearing for the same. Thus not only can rolls of different lengths be accommodated but also rolls with spindles of their own.

It will be apparent from the above description that my roll film holder is simple and inexpensive and capable of supporting rolls of various sizes in convenient positions for permitting loading of the developing tank. The tension on the film can be regulated by determining the proper degree of friction between the spindles and the spool and the holder can be conveniently supported in any position desired.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A film roll holder comprising a U-shaped yoke, oppositely disposed axially adjustable spindles mounted in the legs of said yoke adjacent the free end of said legs for receiving a roll of film for rotatable support between said spindles, said yoke being provided at the closed end with a fastening member for detachably securing the yoke to a support, said spindles being threaded and provided with cone-shaped ends for receiving opposite ends of a spool having recessed bearings and detachable means mounted on the cone-shaped ends of said spindles, each of said detachable means having a recess for receiving one end of a spindle on film roll spools provided with a spindle.

2. A film roll holder comprising a U-shaped yoke, oppositely disposed axially adjustable spindles mounted in the legs of said yoke for rotatably supporting a roll of film, a spring clip secured to said yoke for permitting ready attachment to and detachment from a support, said spindles being threaded and provided with cone-shaped ends, means for each spindle having a recess internally threaded and receiving the cone-shaped end of the spindle, each of said means being provided with an extension having a recess for receiving one end of a spindle of roll film spools provided with a spindle, and means for locking said axially adjustable spindles in position when adjusted to a predetermined position.

3. A film roll holder comprising a U-shaped yoke, oppositely disposed axially adjustable spindles mounted in the legs of said yoke for rotatably supporting a roll of film, a spring clip member secured to said yoke for permitting ready attachment to and detachment from a support, said spindles being provided with cone-shaped ends for receiving opposite ends of a roll film spool having recessed bearings, and means for each spindle having oppositely extending collars each provided with a recess and detachably secured to the ends of said spindles, one of the recesses being threaded to screw over the cone-shaped end of a spindle and the other recess for rceiving the spindles of roll film spools provided with spindles so as to provide a rotatable bearing support for said spools, said means being removed when said axially adjustable spindles are to receive film roll spools having recessed bearings.

4. A film roll holder comprising a spring clip member having a pair of oppositely disposed jaws biased towards one another, supporting legs carried by one of said jaws to support a spool transversely of said jaw, a pair of threaded oppositely disposed spindles mounted in said legs near the free ends thereof and movable toward and from each other for receiving various size spools mounted rotatably on said spindles, lock means mounted on said spindles for locking said spindles in predetermined positions, said spindles being provided with cone ends for receiving a roll film spool, and manual operating members on said spring clip extending transversely of the axis of said spindles, said spindles being threaded, means for each spindle having a recess internally threaded and receiving the end of a spindle, each of said means being provided with an extension provided with a recess for receiving one end of a spindle of roll film spools provided with a spindle, said means being removed when the film roll holder is used to support roll film spools having recessed bearings.

5. A roll film holder comprising a U-shaped yoke, oppositely disposed axially adjustable spindles mounted in the legs of said yoke for rotatably supporting a roll film, a spring clip secured to said yoke to permit ready attachment to and detachment from a support, said spindles being threaded and provided with cone-shaped ends, means for each spindle having a recess internally threaded and receiving the cone-shaped end of the spindle, each of said means being provided with an extension having a recess for receiving one end of a spindle on roll film spools provided with a spindle.

6. A roll film holder comprising a U-shaped yoke, oppositely disposed axially adjustable spindles mounted in the legs of said yoke adjacent the free ends of said legs for rotatably supporting a roll film between said spindles, said yoke being provided at its closed end with a fastening member for detachably securing the yoke to a support, said spindle being provided with cone-shaped ends for receiving opposite ends of a roll film spool having recessed bearings and detachable means mounted on the cone-shaped ends of each of said axially adjustable spindles, each of said detachable means having a recess for receiving one end of a spindle on spools provided with a spindle, said detachable means being removed when the roll film holder is used to support a roll film having a spool with recessed bearings.

7. A roll film holder comprising a spring clip member having a pair of oppositely disposed jaws biased towards one another, support legs on one of said jaws, a pair of threaded oppositely disposed spindles mounted in said legs near the free ends thereof and movable toward and from each other for receiving various size spools mounted rotatably on said spindles, said spindles being provided with cone ends for receiving a roll film spool having recessed bearings, and a member mounted on the cone end of each spindle and having a transverse flange with collars disposed on opposite sides of said flange, one of said collars being internally threaded to receive the threaded end of a spindle, and the other collar providing a recess for receiving one end of a spindle on a roll film spool provided with a spindle, said members being removed when said roll film holder is to support a roll film spool having recessed bearings.

BRYANT HAYS.